United States Patent [19]

Caesar

[11] Patent Number: 5,084,261
[45] Date of Patent: Jan. 28, 1992

[54] RECOVERY AND UTILIZATION OF GYPSTACK LEACHATE IN HEMIHYDRATE PHOSPHORIC ACID PROCESS

[75] Inventor: Michael B. Caesar, Lake City, Fla.

[73] Assignee: Occidental Chemical Corporation, Niagara Falls, N.Y.

[21] Appl. No.: 369,893

[22] Filed: Jun. 22, 1989

[51] Int. Cl.$^5$ ............................................. C01B 25/16
[52] U.S. Cl. .................................. 423/319; 423/320; 423/321 R
[58] Field of Search ................... 423/321 R, 320, 317, 423/319

[56] References Cited

U.S. PATENT DOCUMENTS

| | | | |
|---|---|---|---|
| 3,498,746 | 3/1970 | Smaltz et al. | 423/321 R |
| 3,795,728 | 3/1974 | Scheel | 423/166 |
| 4,134,964 | 1/1979 | Ehlers et al. | 423/321 R |
| 4,557,915 | 12/1985 | Nineuil | 423/319 |

FOREIGN PATENT DOCUMENTS 467843  1/1936  United Kingdom .
1024924  4/1963  United Kingdom .

OTHER PUBLICATIONS

Article by James R. Lear et al., J. Agr. Foodchem., vol. 14, No. 1, pp. 27-33 (1966) titled "Precipitated Impurities in Wet Process Phosphoric Acid".
Article by M. Mathew et al., in American Mineralogist, vol. 66, pp. 392-397 (1981).

Primary Examiner—Gregory A. Heller
Attorney, Agent, or Firm—James F. Tao; Richard D. Fuerle

[57] ABSTRACT

Disclosed is a process for treating a waste stream containing calcium sulfate by depositing said waste stream on a gypstack, collecting the leachate from the gypstack, and recovering the $P_2O_5$ values therefrom. Also disclosed is apparatus comprising means for depositing a waste stream containing calcium sulfate on a gypstack, means for collecting the leachate from the gypstack, and means for recovering the $P_2O_5$ values therefrom. Preferably, at least about 25% of the calcium sulfate is calcium sulfate hemihydrate.

13 Claims, 1 Drawing Sheet

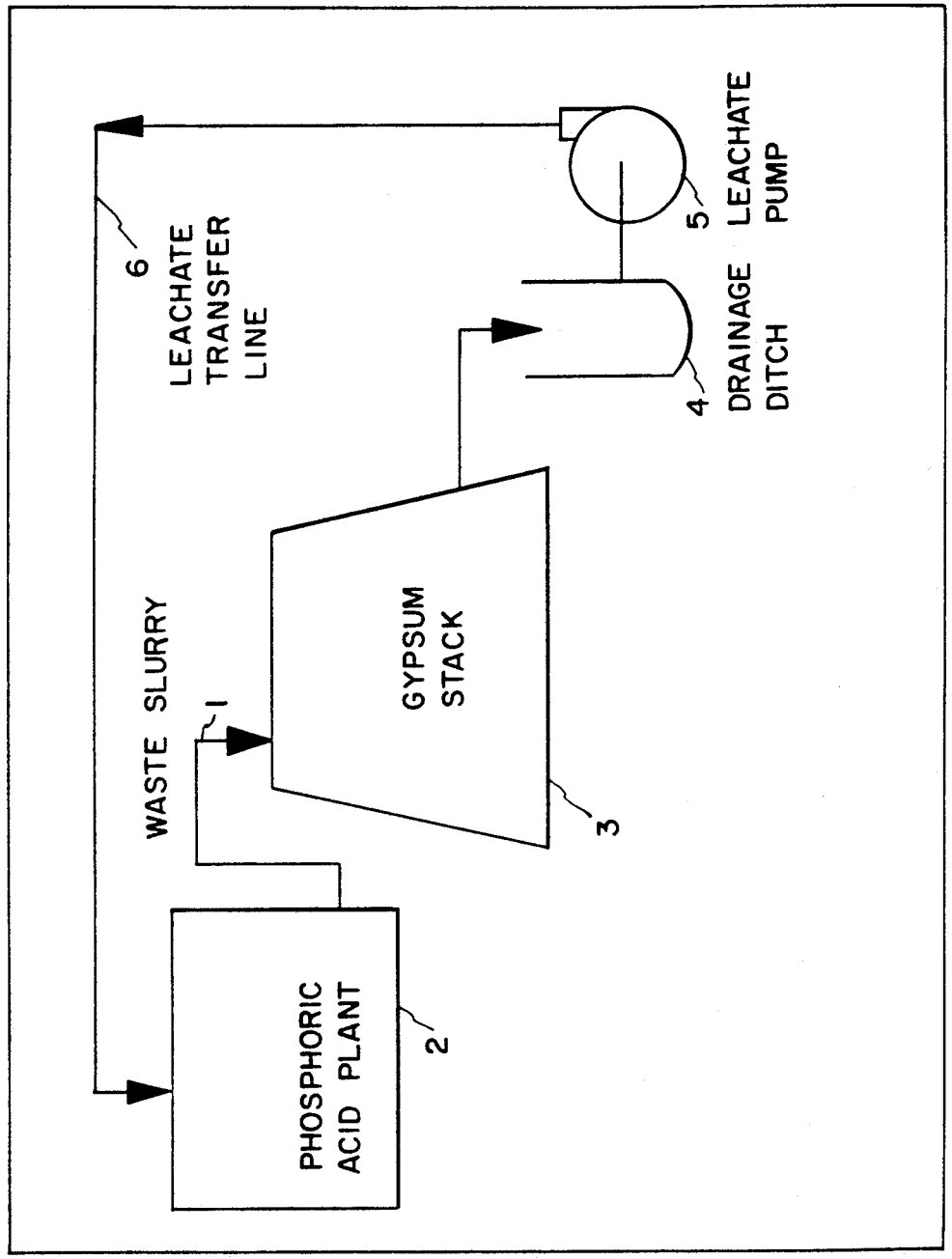

RECOVERY AND UTILIZATION OF GYPSTACK LEACHATE IN HEMIHYDRATE PHOSPHORIC ACID PROCESS

BACKGROUND OF INVENTION

This invention relates to the recovery of $P_2O_5$ from a gypstack in a wet process phosphoric acid operation. In particular, it relates to recycling the leachate from the gypstack back into the phosphoric acid process where the $P_2O_5$ in the leachate is recovered.

Wet phosphoric acid processes for recovering $P_2O_5$ from calcium phosphate rock involve dissolving the rock and precipitating calcium sulfate as the hemihydrate or dihydrate. In conventional wet process phosphoric acid production, the byproduct calcium sulfate, either in the dihydrate and/or hemihydrate form, is stacked on open ground forming a gypstack. The solid calcium sulfate is pumped as a slurry in pondwater to the top of the stack, and the solids settle out on top of the stack. Most of the pondwater, now free of solids, overflows the stack and runs back to the main pond system. Part of the pondwater seeps through the stack and the resulting leachate commonly flows into a canal surrounding the stack.

Varying $P_2O_5$ losses occur in the phosphoric acid process, due to calcium phosphate that is not dissolved, soluble $P_2O_5$ that is not washed out of the cake, and to $P_2O_5$ that is bound in the lattice structure of the calcium sulfate waste product. Higher $P_2O_5$ losses occur in the hemihydrate process when compared to an efficiently run dihydrate process.

SUMMARY OF THE INVENTION

I have discovered that the leachate from a gypstack on which a waste stream containing calcium sulfate is deposited, is significantly higher in $P_2O_5$ than is the liquid phase (the pondwater) of the waste stream liquor. That is, I have found that the $P_2O_5$ values in the waste stream solids are being solubilized into the liquid as it passes through the gypstack, so that the resulting leachate contains recoverable and useful amounts of $P_2O_5$. This is particularly true when the calcium sulfate is in the hemihydrate form.

Also, I have found that the concentration of several contaminants in the leachate is substantially lower than their concentration in the pondwater. For example, I have found that the concentration of fluorine in the leachate is up to six times less than its concentration in the pondwater, which means that fluorine is precipitated in the gypstack. The insolubilization of fluorine in the gypstack obviates the necessity of immobilizing it at a later stage to prevent it from contaminating ground water. Also, the concentration of silica in the leachate is only about one third its concentration in the pondwater. The removal of silica is important because silica forms a gel which can impede filtration when pondwater or leachate is used as a cake wash. In gel form silica is reactive and forms alkaline fluosilicates which, in cold weather, form hard impervious scale in pondwater pipelines. Also, the concentration of aluminum in the leachate is about half that in pondwater. Aluminum is a gross contaminate of phosphoric acid which, besides being a diluent and making it less valuable, interferes with downstream operations such as granulation. Thus, by recovering leachate and utilizing it in the phosphoric acid process in place of pondwater, not only am I able to obtain a significant increase in $P_2O_5$ recovery, but I am also able to reduce the concentration of contaminants in the phosphoric acid.

DESCRIPTION OF THE INVENTION

The accompanying drawing is a block diagram which illustrates a certain presently preferred embodiment of a process and apparatus according to this invention.

In the drawing, a waste stream slurry 1 from a phosphoric acid process 2, which contains calcium sulfate, is deposited on top of a gypstack 3 where liquid from the slurry and rainwater gradually seep through the gypstack forming a leachate. The leachate is collected in ditches 4 which surround the gypstack and is pumped by pumps 5 through lines 6 back to the phosphoric acid process 2 where the $P_2O_5$ values in it are recovered.

The waste stream from which the $P_2O_5$ values are recovered in the process of this invention is an aqueous slurry containing solid calcium sulfate, which may be in the dihydrate form, the hemihydrate form, or in a mixture of the two forms. The process of this invention is particularly useful if the waste stream contains calcium sulfate hemihydrate because the gradual conversion of the calcium sulfate hemihydrate to calcium sulfate dihydrate results in the release of the $P_2O_5$ values and in the insolubilization of the contaminants fluorine, aluminum, and silica. Preferably, at least about 25% of the solids in the waste stream are calcium sulfate hemihydrate, the remainder being primarily calcium sulfate dihydragte; most preferably, at least about 45% of the solids are calcium sulfate hemihydrate.

When the waste stream is deposited on top of the gypstack, the solids settle out on the gypstack and most of the liquid runs off and is returned to the bulk pondwater system. Once the waste stream has been deposited on the gypstack, any calcium sulfate hemihydrate that is present quickly converts to calcium sulfate dihydrate (gypsum) so that the gypstack consists almost entirely of gypsum. Since the quantities involved in a phosphoric acid recovery process are so large, the gypstack is normally formed on open land so that rainwater combines with the liquor in the waste stream that seeps through the gypstack to form leachate. While gypstacks can be 100 feet or more in height, so that many years are required for liquid to seep through them, such great depths are not required to obtain an improved $P_2O_5$ recovery in the leachate and the removal of contaminants therefrom.

The leachate can be collected from the gypstack by placing ditches around the gypstack so that the leachate runs into the ditches as it seeps from the gypstack. While the concentration of $P_2O_5$ in the leachate will vary depending upon which part of the gypstack it seeps through, generally the leachate contains about 3 to about 4.2% $P_2O_5$, which compares with pondwater, at about 2% $P_2O_5$. The concentration of fluorine in the leachate is typically about 500 to about 4000 ppm, the concentration of silica is typically about 500 to about 3500 ppm, and the concentration of aluminum (as $Al_2O_3$) is typically about 200 to about 1000 ppm. The leachate can be used as a wash in the phosphoric acid process to replace washes of lower $P_2O_5$ content, such as pondwater. For example, the leachate can be used to wash calcium sulfate on the acid plant filter, or it can be used to wash ralstonite on the purification filter (see U. S. Pat. No. 4,443,421). The leachate can also be used to repulp (i.e., re-slurry) a filter cake.

The following examples further illustrate this invention.

EXAMPLE 1

The following analyses illustrate the differences in leachate composition from different positions around a gypstack and compare them with the pondwater.

|           | Position | $P_2O_5$ wt % | F wt % | $SiO_2$ wt % | $Al_2O_3$ wt % |
|-----------|----------|---------------|--------|--------------|----------------|
| Leachate  | A        | 3.95          | 0.12   | 0.07         | 0.04           |
| "         | B        | 3.83          | 0.23   | 0.22         | 0.07           |
| "         | C        | 3.87          | 0.44   | 0.24         | 0.08           |
| "         | D        | 4.04          | 0.16   | 0.1          | 0.03           |
| Pondwater |          | 2.15          | 1.04   | 0.66         | 0.09           |

EXAMPLE 2

A 4 inch diameter laboratory column was filled to a depth of 4 feet with waste calcium sulfate solids from a phosphoric acid plant. The column was topped up with pondwater. Leachate was withdrawn daily from the bottom of the column to give a downward liquid velocity in the column corresponding to the measured velocity in the stack of Example 1. The column was topped up daily with pondwater. The initial leachate concentration was 0.8% higher in $P_2O_5$ than the pondwater. Leachate $P_2O_5$ concentration peaked at 1.5% higher than pondwater at 125 days, then declined over the next 40 days to pondwater value. Fluorine, aluminum, and silica declined steadily over the same period.

It is claimed:

1. In a wet phosphoric acid method where $P_2O_5$ values are recovered by dissolving phosphate rock and precipitating calcium sulfate, and pondwater containing solid calcium sulfate is deposited on a gypstack the improvement comprising increasing the recovery of said $P_2O_5$ values from said phosphate rock comprising substituting leachate from said gypstack for at least some of said pondwater used in said method.

2. A method according to claim 1 wherein at least 25% of said calcium sulfate is calcium sulfate hemihydrate.

3. A method according to claim 1 wherein the concentration of $P_2O_5$ in said pondwater is about 2% and the concentration of $P_2O_5$ in said leachate is about 3 to about 4.2%.

4. A method according to claim 1 wherein said calcium sulfate is calcium sulfate dihydrate.

5. A method of treating a waste stream which comprises a slurry of calcium sulfate, comprising
   (a) depositing said waste stream on a stack of gypsum;
   (b) collecting leachate that has passed through said stack of gypsum; and
   (c) recovering $P_2O_5$ values from said leachate.

6. A method according to claim 5 wherein at least 25% of said calcium sulfate is calcium sulfate hemihydrate.

7. A method according to claim 6 wherein at least about 45% of said calcium sulfate is calcium sulfate hemihydrate.

8. A method according to claim 5 wherein said leachate is used to wash calcium sulfate hemihydrate on a filter in a phosphoric acid process.

9. A method according to claim 5 wherein said leachate is used to wash ralstonite on a filter.

10. A method according to claim 5 wherein said leachate is used to repulp a filter cake.

11. A method according to claim 5 wherein said leachate is collected in ditches around said gypstack.

12. A method according to claim 5 wherein the concentration of $P_2O_5$ in said pondwater is about 2% and the concentration of $P_2O_5$ in said leachate is about 3 to about 4.2%.

13. A method according to claim 5 wherein said calcium sulfate is calcium sulfate dihydrate.

* * * * *